Feb. 14, 1933.                M. GOEBEL                1,897,374
                              PIPE CUTTER
                           Filed Feb. 8, 1932

Witness:
Geo L Chapel

Inventor
Max Goebel

By Rice and Rice
Attorneys

Patented Feb. 14, 1933

1,897,374

UNITED STATES PATENT OFFICE

MAX GOEBEL, OF GRAND RAPIDS, MICHIGAN

PIPE CUTTER

Application filed February 8, 1932. Serial No. 591,611.

The present invention relates to pipe and rod cutters; and its object is, generally, to provide an improved implement of that character provided with a tool for removing the bur formed by the cutting operation; and more particularly, to provide in such an implement, an improved bur-removing tool; and further, to provide such a tool having an improved work-engaging portion; and further, to provide an improved adjustable mounting for such a tool.

These and any other and more specific objects hereinafter appearing are attained by, and the invention finds preferable embodiment in, the implement particularly described in the body of this specification and illustrated by the accompanying drawing, in which.

Figure 4:
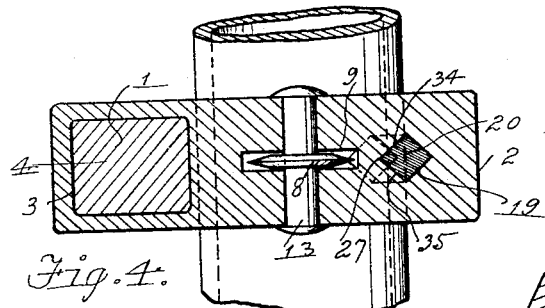
Figure 4 is a sectional view of parts of the implement taken on line 4 of Figure 2.

The pipe and rod cutting implement illustrated by the drawing comprises a body member 1 and a member 2 through whose opening 3 the shank 4 of the body member slidably bears. Said body member has an inwardly-concave lateral extension 5 at one end and a lateral extension 6 at its opposite end. Pipe or rod cutting means—preferably sharp-edged cutting wheels—are arranged in the same plane, their axles being disposed in a triangle including the axis of the work piece as the pipe 7 operated on by the implement. These cutting means include the wheel 8 in a recess 9 in member 2 and the spaced wheels 10, 11 in a recess 12 in the extension 5 of member 1, and having the axles 13, 14, 15 respectively.

A cylindrical extension 16 of member 2 has a bore 17 upwardly open at 18 and a bearing 19 at its lower end in which the elongated tool 20 slidably bears and through which its cutting end portion extends in a direction diametrical of the pipe or work piece 7. This tool has a head 21 pressed outwardly by a coiled spring 22 in the bore 17. The extension 16 of member 2 is externally threaded at 23 and a hollow cylindrical cap 24 is internally threaded thereon and contains a coiled spring 25, stronger than spring 22 and bearing at its ends on the outer side of the tool's head 21 and on the inner side of the end 26 of the cap.

Figure 2:
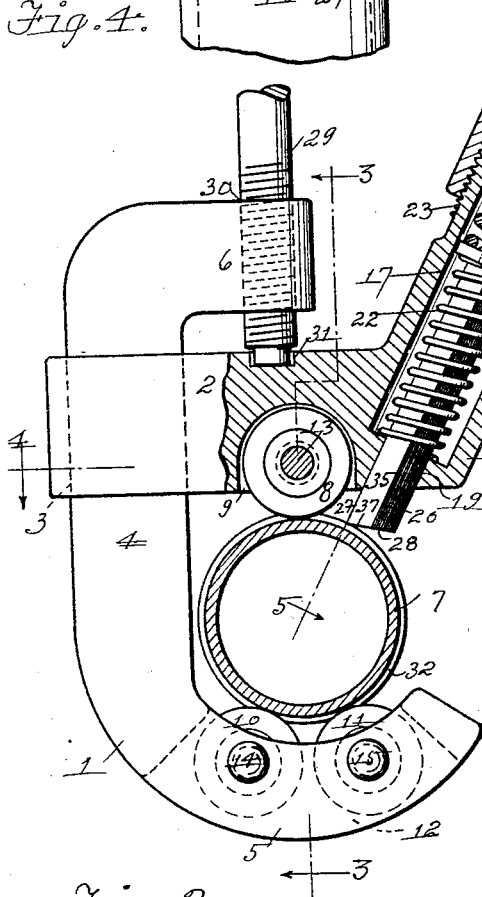
Figure 2 is a like view of the same, but showing the pipe partially cut and showing a portion of the implement in section taken on line 2 of Figure 3.

The tool 20 is shown rectangular in cross section, and its front edge 27 lies at an acute angle to the extremity or bottom end 28 of the tool as particularly well shown in Figure 2.

Figures 3, 5:
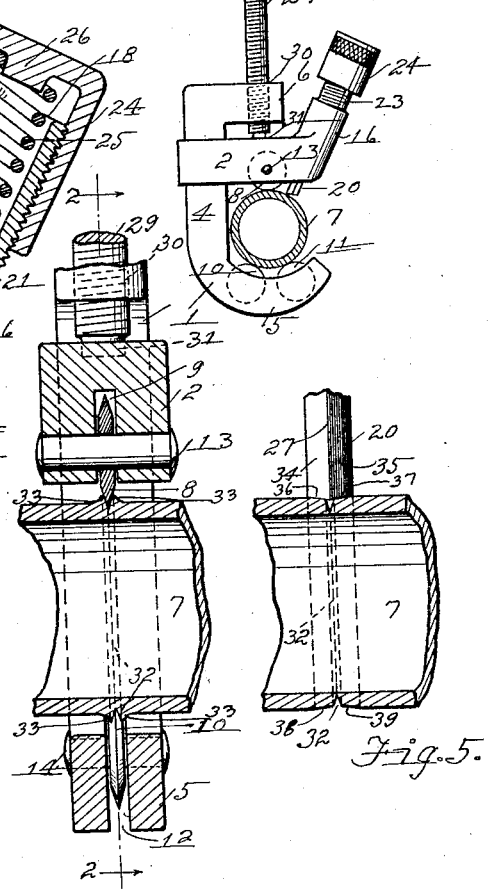
Figure 3 is a sectional view thereof taken on line 3 of Figure 2.
Figure 5 is a front edge view of the bur-removing tool and a sectional view of the pipe taken on line 5 of Figure 2.

In operation, the work piece, as the pipe 7, is held in a vise and the implement is turned about the pipe's axis. The member 2 is moved toward said pipe by turning the screw 29 threaded at 30 in member 1 and bearing endwise at 31 on member 2, to cause the wheels to cut the pipe circularly as shown at 32 in Figure 2. This cutting action forms burs 33 on the opposite sides of the circular cut as seen in Figure 3. The cap 24 is now turned to move the tool 20 into operative engagement with these burs which are thereby cut or scraped away and removed from the surface of the pipe, by the cutting bottom edges 36, 37 of the two front sides 34, 35 of the tool which sides are angularly disposed cross-sectionally of the tool, whose front edge 27 travels in the circular cut 32. The tool may be further moved by turning the cap 24 so as to bevel the pipe at the opposite sides of the circular cut as shown at 38, 39 in Figure 5.

The operation of the cutter wheels and the bur-removing operation of the tool 20 may be alternated, or the operation of said wheels and tool may be, in some cases, carried on simultaneously until the pipe is severed.

Figure 1:
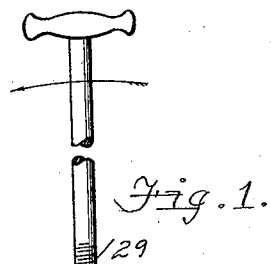
Figure 1 is a side view of a pipe and rod cutting implement and a cross sectional view of a pipe therein.

It is evident that the implement may be turned in either direction about the pipe to cut the same by the wheels, but is to be turned in the direction of the curved arrow in Figure 1 to cut off the burs; although the implement may be turned in the opposite direction to flatten out or upset such burs formed on pipes or rods of some materials.

In this use, the inclination of the extremity 28 relatively to the edge 27 of the tool is effective and the angularly disposed sides 34, 35 of the tool upset the burs away from each other and from the circular cut between them.

The invention being intended to be pointed out in the claim, is not to be limited to or by details of construction of the particular embodiment thereof illustrated by the drawing or hereinbefore described.

I claim:

In an implement turnable about a cross-sectionally round work piece for severing the same into lengths; a body member; a member slidable on said body member toward the work piece held between said members and having a bore and a slide bearing extending toward the work piece; a tool carried by one of said members for cutting the work piece circumferentially; an elongated tool slidable in said bearing for removing burs formed by the cutting tool; a spring in the bore urging the second-mentioned tool outwardly; a hollow cap threaded around the second-mentioned member for moving the second-mentioned tool toward the work piece; a spring stiffer than the first-mentioned spring intermediate the cap and the second-mentioned tool for yieldingly moving the same against the pressure of the first-mentioned spring; threaded means for moving the second-mentioned member slidably on said body member toward the work piece.

In testimony whereof I have hereunto set my hand at Grand Rapids, Michigan, this 5th day of February, 1932.

MAX GOEBEL.